United States Patent [19]

Wise et al.

[11] 3,712,584
[45] Jan. 23, 1973

[54] VALVE AND METHOD OF MAKING SAME

[75] Inventors: Eugene H. Wise, Saugus; Homer W. Galt, Burbank, both of Calif.

[73] Assignee: The Susquehanna Corporation, Fairfax County, Va.

[22] Filed: Feb. 17, 1971

[21] Appl. No.: 116,210

Related U.S. Application Data

[63] Continuation of Ser. No. 857,058, Sept. 11, 1969, abandoned.

[52] U.S. Cl.................................251/162, 251/315
[51] Int. Cl................................................F16k 5/20
[58] Field of Search........251/315, 309, 308, 162, 163

[56] References Cited

UNITED STATES PATENTS

| | | | |
|---|---|---|---|
| 3,064,937 | 11/1962 | Pryor | 251/163 |
| 3,171,429 | 3/1965 | Sturmer et al. | 251/163 X |
| 2,711,302 | 6/1955 | McWhorter | 251/163 |
| 3,155,368 | 11/1964 | Shafer | 251/175 |
| 3,223,111 | 12/1965 | Anderson | 137/454.6 |
| 3,244,398 | 4/1966 | Scaramucci | 251/148 |
| 3,410,523 | 11/1968 | Kelly et al. | 251/163 X |
| 3,450,151 | 6/1969 | Heutzenroeder | 137/375 |
| 3,467,355 | 9/1969 | Burke | 251/163 |
| 3,484,078 | 12/1969 | Haenky | 251/163 X |

Primary Examiner—Samuel Scott
Attorney—Martha L. Ross

[57] ABSTRACT

A valve of the type wherein a valve member having a passageway therethrough is rotatably mounted within a valve body or housing having inlet and outlet passages. The valve body is provided with one or more raised portions on its interior surface which serve to firmly engage or bias the valve member when it is rotated to the closed position, thereby preventing leakage be the valve member and the body. In the manufacture of such a valve in accordance with the method of the present invention, the valve body is formed of a suitable plastic material and is molded about the valve member. The valve member is placed in the open position in the mold and is provided with one or more recessed portions on the outer surface thereof so that complementary raised portions are formed on the inner surface of the molded valve body which serve to firmly engage or bias the valve member when it is rotated to the closed position.

9 Claims, 6 Drawing Figures

PATENTED JAN 23 1973

INVENTORS
HOMER W. GALT
EUGENE H. WISE
BY Frank P. Presta
ATTORNEY

VALVE AND METHOD OF MAKING SAME

This application is a continuation of U.S. Ser. No. 857,058, filed Sept. 11, 1969, now abandoned.

BACKGROUND AND SUMMARY OF THE INVENTION

This invention relates generally to a new and improved rotary-type valve and method of making the same. More particularly, the invention relates to a leakproof rotary-type valve wherein the rotatable valve member is firmly biased or engaged by the valve body when in the closed position to prevent leakage therebetween, and to a method of making such a valve wherein the valve body is formed of a plastic material and is molded about the valve member.

Heretofore, it has been necessary to provide one or more sealing members between the rotatable valve member and the valve body of rotary-type valves in order to prevent leakage between the valve member and the body. The use of such sealing members not only has added to the cost of manufacture of such valves, but also has complicated the assembly and manufacture of such valves. In many types of rotary valves, it has also been necessary to provide separate retaining means for such sealing members and, in some instances, to provide adjusting means to compensate for wear of the sealing members caused by relative movement between the valve member and valve body.

Accordingly, a need has arisen for a simple and inexpensive rotary-type valve wherein sealing members are not required between the movable valve member and the valve body. A need has also arisen for a simple method of manufacturing such rotary-type valves. These needs are fulfilled by the present invention which provides a leakproof rotary-type valve which does not require the use of sealing members between the rotatable valve member and valve body, and a simple method for inexpensively manufacturing such valves.

It is an object of the present invention, therefore, to provide a new and improved rotary-type valve.

An additional object is to provide a new and improved rotary-type valve which does not require the use of sealing members between the rotatable valve member and the surrounding valve body.

A further object is to provide such a rotary-type valve wherein the rotatable valve member is urged into tight engagement with the surrounding valve body when it is in the closed position to prevent leakage therebetween.

Another object is to provide such a rotary-type valve wherein a "snap-in" stop is provided for the valve member when it is in the open position.

A still further object is the provision of a simple method of forming such a rotary-type valve wherein the valve body is formed of a suitable plastic material and is molded about the rotatable valve member.

Numerous other objects and advantages of the present invention will be apparent as it is better understood from the following description, which, taken in connection with the accompanying drawings, discloses preferred embodiments thereof.

The above objects are accomplished by providing a valve of the type wherein a valve member having a passageway therethrough is rotatably mounted within a valve body having inlet and outlet passages. The body is provided with one or more raised portions on its inner surface which are adapted to firmly engage or bias the valve member when it is rotated to the closed position, thereby preventing leakage between the valve member and body.

In the manufacture of such a valve in accordance with the method of the present invention, the valve body is formed of a suitable plastic material and is molded about the valve member. Prior to molding, the valve member is placed in the open position in the mold and is provided with one or more recessed portions on its outer surface so that complementary raised portions will be formed on the inner surface of the molded valve body when the plastic material thereof flows into the recessed portions. The raised portions on the molded valve body are so positioned as to firmly engage or bias the valve member when it is rotated to the closed position to effectively prevent leakage between the valve member and body.

Referring to the drawings.

DESCRIPTION OF THE PREFERRED EMBODIMENTS

Figure 1:
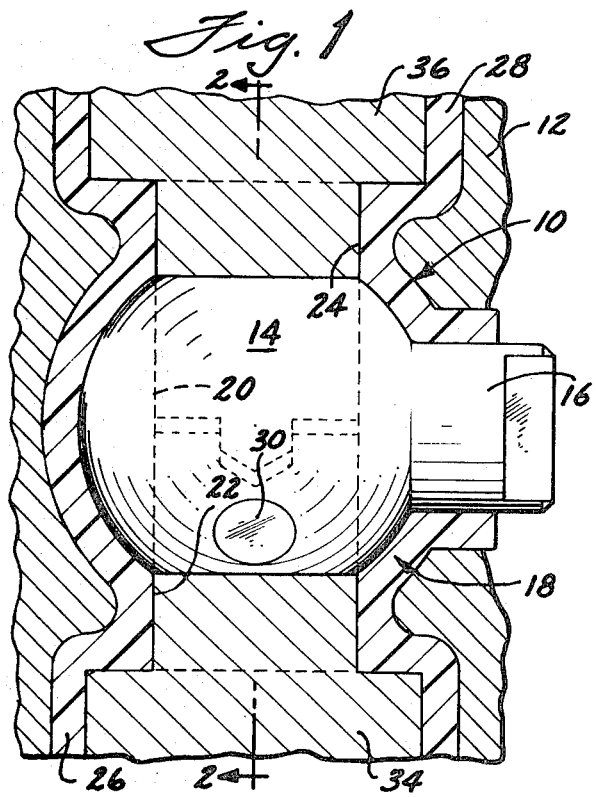
FIG. 1 is an elevational view, partly in section, of a rotary-type valve formed in accordance with the principles of the present invention, showing the valve member in the open position within the mold for the valve body.

FIG. 1 illustrates a first embodiment of a rotary-type valve 10 of the present invention after it has been formed in a mold 12 in accordance with the method of this invention. The valve 10 comprises a valve member 14, which may be of any suitable shape, such as a ball or a cylindrical or tapered plug, and a stem portion 16 formed integrally with the valve member or secured thereto in any conventional manner. The valve member 14 and stem portion 16 are rotatably mounted within a valve body or housing 18. A handle (not shown) may be formed integrally with or secured to the stem portion 16 so that it can be conveniently rotated. Also, the stem portion 16 may be provided with an annular groove (not shown) in which an O-ring or other suitable type of annular sealing member may be disposed to provide a leakproof seal between the stem portion and the valve body 18 in a conventional manner.

The valve member 14 is provided with a passageway 20 through the center portion thereof which is adapted to be positioned in alignment with inlet and outlet passages 22 and 24 in the valve body 18 when the valve member is in the open position shown in FIG. 1. The valve body 18 is provided with enlarged cylindrical socket portions 26 and 28 adjacent the inlet and outlet passages 22 and 24, respectively, which may be connected in any suitable manner to adjacent portions of a pipeline (not shown).

Figure 2:
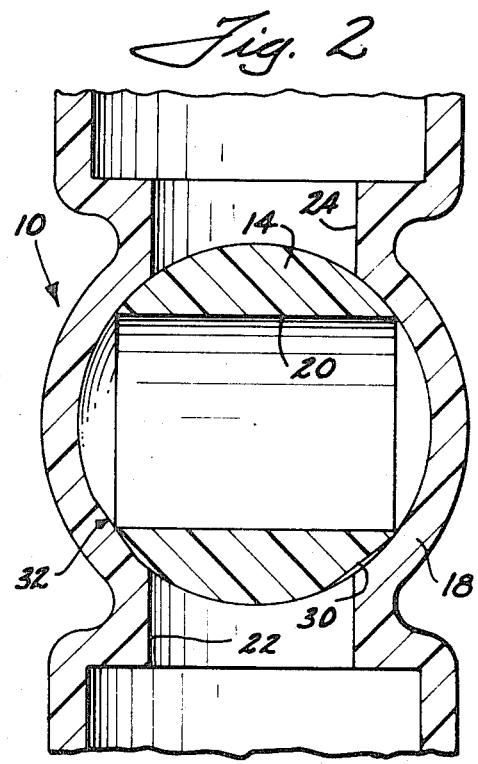
FIG. 2 is a sectional view taken substantially along line 2—2 in FIG. 1, showing the valve member in the closed position and excluding the mold and core members.

As shown in FIGS. 1 and 2, the valve member 14 is provided with a flat or recessed portion 30 on its curved outer surface. The valve body 18 is provided with a flat or raised portion 32 on its curved inner surface that is complementary with the valve member surface 30 and is adapted to mate therewith when the valve member 14 is in the open position shown in FIG. 1. Within the scope of this invention, the complementary portions 30 and 32 may be curved or of any other suitable shape other than flat.

When the valve member 14 is rotated to the closed position shown in FIG. 2 (in a counterclockwise direction as shown in FIG. 2), the flat portion 30 on the valve member is moved away from the flat portion 32 on the valve body, and thus the valve body portion 32 engages the curved outer surface of the valve member 14 and serves to urge or bias it into tight engagement with the interior surface of the valve body 18. This tight engagement serves to prevent leakage between the valve member and valve body when the valve member is in the closed position.

Preferably, the raised flat portion 32 on the interior surface of the valve body 18 is positioned near the inlet passage 22 of the valve body so that it will serve to urge the valve member toward the outlet passage of the valve body when the valve member is rotated to the closed position shown in FIG. 2. In this manner, the pressure of the fluid in the inlet passage 22 can be utilized to aid in urging the valve member toward the outlet passage. It is noted, however, that the raised portion 32 could be positioned elsewhere on the valve body, such as near the outlet passage 24, without departing from the scope of the present invention.

In the manufacture of the valve 10 in accordance with the method of the present invention, the valve member 14 is formed with the flat or recessed portion 30 on the exterior surface thereof and is positioned within the mold 12, as shown in FIG. 1. Stepped core members 34 and 36, which have an external configuration that is complementary with the internal configuration of the valve body 18, are then slideably positioned within the passageway 20 of the valve member 14. Thereafter, a suitable plastic material is introduced into the mold 12 and surrounds the core members 34 and 36 and the valve member 14 and stem portion 16 to form the valve body 18. When this molding operation is completed, the molded valve body 18 and enclosed valve member 14 and stem portion 16 are removed from the mold 12 in any suitable or conventional manner, and a handle (not shown) may thereafter be attached to the stem portion 16.

Since the interior surface of the valve body 18 is complementary with the exterior surface of the valve member 14, the raised flat portion 32 is formed on the interior surface of the valve body and is complementary with and positioned adjacent to the recessed flat portion 30 on the valve member 14 when it is in the open position shown in FIG. 1. Thereafter, when the valve member 14 is rotated to the closed position shown in FIG. 2, the raised flat portion 32 on the interior surface of the valve body 18 firmly engages the curved exterior surface of the ball member 14 and biases it in the manner described above.

As an illustrative example, the valve member 14 and stem portion 16 may be formed of any suitable material, such as metal, plastic or a ceramic material; and the valve body 18 may be formed of any suitable plastic material that may be molded about the valve member, such as polyvinyl chloride (PVC), polypropylene, polyethylene or acrylonitrile butastyrene (ABS).

Figure 3:
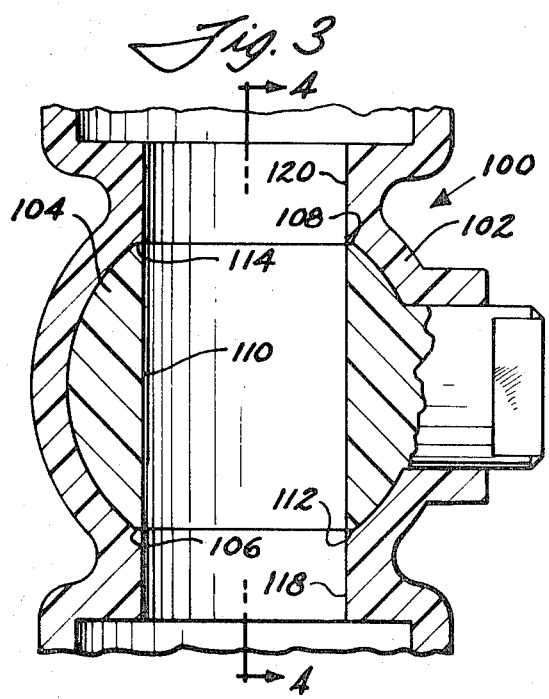
FIG. 3 is an elevational view, partly in section, of a second embodiment of a rotary-type valve formed in accordance with the principles of the present invention, showing the valve member in an open position.
Figure 4:
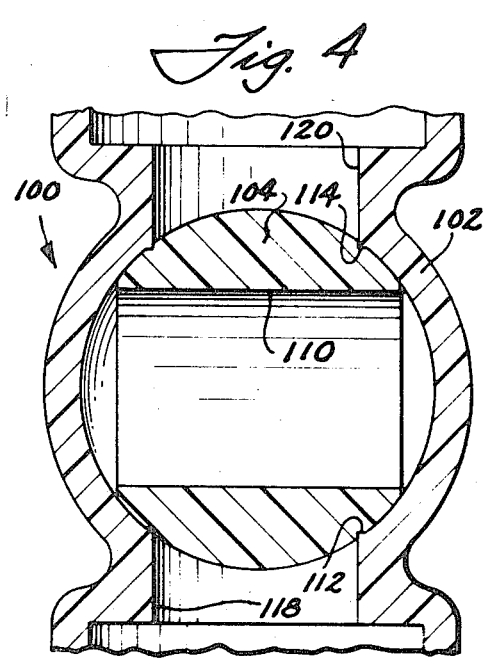
FIG. 4 is a sectional view taken substantially along line 4—4 in FIG. 3, showing the valve member in a closed position.

FIGS. 3 and 4 disclose a second embodiment of a rotary-type valve 100 which is constructed in accordance with the principles of the present invention. The valve 100 can be formed in accordance with the method described above wherein the valve body 102 is molded about the valve member 104.

In accordance with this second embodiment of the invention, the valve member 104 is provided with annular flat or recessed surfaces 106 and 108 on the exterior surface thereof surrounding the ends of the passageway 110 therethrough. When the valve body 102 is molded about the valve member 104 in the open position shown in FIG. 3, raised annular portions 112 and 114 are formed on the interior surface of the valve body adjacent to the inlet and outlet passages 116 and 118 thereof. The raised annular portions 112 and 114 on the interior of the valve body 102 are complementary with the flat annular surfaces 106 and 108, respectively, on the exterior of the valve member 104.

As shown in FIG. 4, when the valve member 104 is rotated to the closed position, the raised annular portions 112 and 114 on the valve body 102 are moved out of contact with the flat annular valve member surfaces 106 and 108 and into firm contact with the curved outer surface of the valve member 104, thereby tightly engaging the valve member and presenting an obstacle in the form of "band seals", to leakage between the valve member and valve body. The provision of the dual, annular, complementary surfaces on the valve member and valve body also provides for a snap fit of the valve member within the valve body when the valve member is again rotated to the open position shown in FIG. 3, owing to the mating engagement of the annular surfaces.

Within the scope of the present invention, a flat annular surface could be provided on only one end of the valve member 104, with the result that only one annular raised portion would be formed on the valve body. In such a case, the annular raised portion on the valve body would sealingly engage the curved surface on only one side of the valve member when it was rotated to a closed position to provide a "band seal" and to bias or urge the valve member into tight engagement with the opposite end of the valve body, thereby preventing leakage between the valve member and the valve body.

Figure 5:
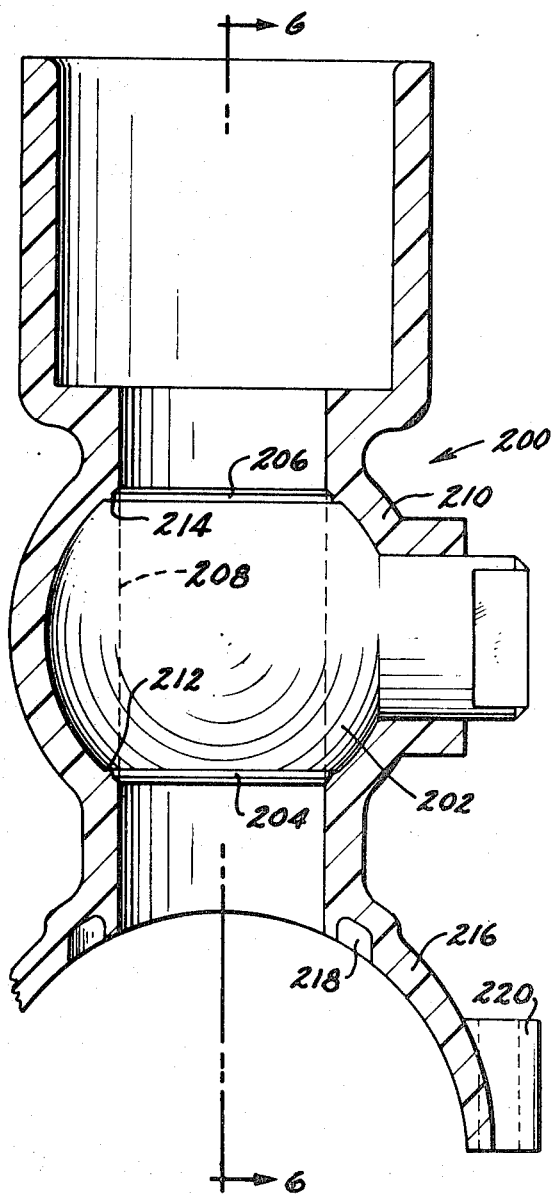
FIG. 5 is an elevational view, partly in section, of a third embodiment of a rotary-type valve formed in accordance with the principles of the present invention, showing the valve member in an open position.
Figure 6:
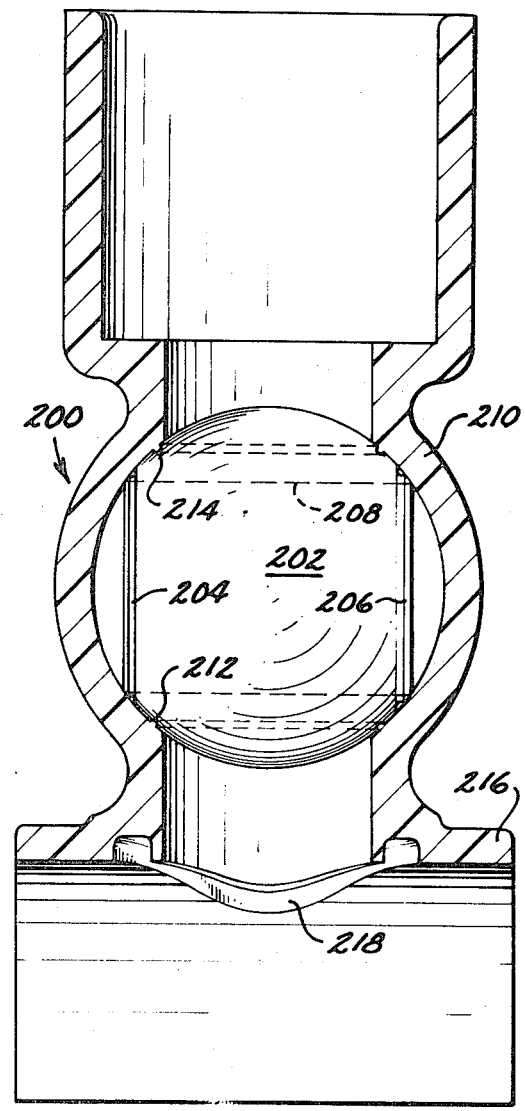
FIG. 6 is a sectional view taken substantially along line 6—6 in FIG. 5, with the valve member unsectioned and in a closed position.

FIGS. 5 and 6 illustrate a third embodiment of a rotary-type valve 200 formed in accordance with the principles of the present invention. In this embodiment, the valve member 202 is provided with annular grooves 204 and 206 adjacent the ends of the passageway 208 therethrough. When the valve body 210 is molded around the valve member 202 in accordance with the method of the present invention, the valve body is formed with inwardly extending annular portions 212 and 214 that are complementary with the valve member grooves 204 and 204 respectively.

When the valve member 202 is rotated from the open position shown in FIG. 5 to the closed position shown in FIG. 6, the inwardly extending annular valve body portions 212 and 214 tightly engage the curved outer surface of the valve member 202 and serve to present obstacles in the form of "band seals," to leakage between the valve member 202 and valve body 210 when the valve member is in the closed position. In a manner similar to the valve 100 shown in FIGS. 3 and 4, the valve 200 could be provided with only one annular groove in the valve member 202 which would result in the formation of only one inwardly extending annular portion on the inner surface of the valve body 210. This annular surface on the valve body would then serve to sealingly engage the outer curved surface of the valve member when it was rotated to the closed position shown in FIG. 6 to provide a "band seal" and to urge or bias the valve member into tight engagement with the opposite end of the valve body, thereby preventing leakage between the valve member and valve body.

As further shown in FIGS. 5 and 6, the valve of the present invention by be used in conjunction with a pipe saddle 216 which could be molded integrally with the valve body 210. Preferably, the pipe saddle 216 is provided with an inner annular groove 218 for the accommodation of an O-ring or other type of annular sealing member (not shown), and an apertured portion 220 for receiving a bolt (not shown) or the like for use in securing the saddle member 216 to a complementary saddle member (not shown).

It is thought that the invention and many of its attendant advantages will be understood from the foregoing description, and it will be apparent that various changes may be made in the instant valves and method without departing from the spirit or scope of the invention or sacrificing all of its material advantages, the forms hereinbefore described being merely preferred embodiments thereof.

We claim:

1. A valve, comprising:
 a valve body formed of a substantially rigid material and having inlet and outlet passages,
 a valve member rotatably mounted within said valve body and having a passageway therethrough, said valve member being movable between an open position wherein said passageway is aligned with said passages and a closed position wherein said passageway is out of alignment with said passages, said valve member having a recessed portion on the outer surface thereof,
 said valve body having a substantially rigid raised portion on the inner surface thereof that is adapted to mate with said recessed portion when said valve member is in the open position, said raised portion being positioned so as to be out of engagement with said recessed portion and in tight engagement with the outer surface of said valve member when it is in the closed position to prevent leakage between said valve member and said valve body,
 said valve member having a unitary construction which substantially retains its configuration during operation of the valve.

2. The valve of claim 1 wherein said raised portion is positioned adjacent to the inlet passage of said valve body so as to urge said valve member toward the portion of said valve body adjacent to said outlet passage when said valve member is in the closed position.

3. The valve of claim 2 wherein said raised portion and said recessed portion have an annular configuration.

4. The valve of claim 3 wherein said valve body has a second substantially rigid annular raised portion on the inner surface thereof adjacent to the outlet passage thereof, and said valve member has a second annular recessed portion on the outer surface thereof that is complementary with said second raised portion and adapted to mate therewith when said valve member is in the open position, said second raised portion being positioned so as to be out of engagement with said second recessed portion and in tight engagement with the outer surface of said valve member when it is in the closed position.

5. A valve as claimed in claim 1 further comprising means connected to said valve member for rotating said valve member within said valve body.

6. A valve as claimed in claim 5 wherein said valve member is a ball, and said valve body is molded about said ball in contact therewith except at said passages.

7. A valve, comprising:
 a valve body formed of a substantially rigid material and having inlet and outlet passages,
 a ball rotatably mounted within said valve body and having a passageway therethrough, said ball being movable between an open position wherein said passageway is aligned with said passages and a closed position wherein said passageway is out of alignment with said passages, said ball having a first annular flat surface provided on the outer surface thereof surrounding and adjacent to the passageway through said ball at the inlet passage of said valve body and a second annular flat surface provided on the outer surface thereof surrounding and adjacent to the passageway through said ball at the outlet passage of said valve body,
 said valve body having a first substantially rigid annular raised portion formed on the inner surface thereof adjacent to and surrounding said inlet passage, said first raised portion complementary with the first flat surface of said ball and adapted to mate therewith when said ball is in the open position, said first raised portion being positioned so as to be out of engagement with said first flat surface and in tight engagement with the outer surface of said ball when it is in the closed position, and a second substantially rigid annular raised portion formed on the inner surface thereof adjacent to and surrounding said outlet passage, said second raised portion complementary with said second flat surface of said ball and adapted to mate therewith when said ball is in the open position, said second raised portion being positioned so as to be out of engagement with said second flat surface and in tight engagement with the outer surface of said ball when it is in the closed position, thereby to prevent leakage between said ball and said valve body.

8. A valve as claimed in claim 7 wherein said ball is of a unitary construction which substantially retains its configuration during operation of the valve.

9. A valve as claimed in claim 8 further comprising means connected to said ball for rotating said ball within said valve body.

* * * * *